(12) United States Patent
Jewess et al.

(10) Patent No.: US 8,215,919 B2
(45) Date of Patent: Jul. 10, 2012

(54) CURVED TOOTH COUPLING FOR A MINIATURE GAS TURBINE ENGINE

(75) Inventors: Gordon F. Jewess, San Diego, CA (US); Tuan H. Nguyen, San Diego, CA (US); Tammy L. Lane, San Diego, CA (US); Reginald G. Keetley, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 1345 days.

(21) Appl. No.: 12/070,968

(22) Filed: Feb. 22, 2008

(65) Prior Publication Data

US 2009/0214331 A1 Aug. 27, 2009

(51) Int. Cl.
| | |
|---|---|
| B63H 1/28 | (2006.01) |
| B63H 5/00 | (2006.01) |
| B63H 7/00 | (2006.01) |
| B63H 13/00 | (2006.01) |
| B63H 15/00 | (2006.01) |
| B64C 11/14 | (2006.01) |
| B64C 27/32 | (2006.01) |
| F01D 5/00 | (2006.01) |
| F01D 25/00 | (2006.01) |
| F03B 1/02 | (2006.01) |
| F03B 11/00 | (2006.01) |
| F03D 11/00 | (2006.01) |
| F04D 29/00 | (2006.01) |

(52) U.S. Cl. ................................. 416/244 R
(58) Field of Classification Search ........... 416/244 R, 416/244 A, 212 R, 212 A, 204 A, 175, 198 A, 416/198 R, 200 A, 201 A, 201 R, 198.1, 216.1, 200 R; 415/198.1, 216.1
See application file for complete search history.

(56) References Cited

U.S. PATENT DOCUMENTS

| | | | |
|---|---|---|---|
| 2,384,582 A | | 9/1945 | Wildhaber |
| 2,427,641 A | | 9/1947 | Wildhaber |
| 2,558,203 A | | 6/1951 | Wildhaber |
| 3,640,030 A | | 2/1972 | Clarke et al. |
| 3,731,433 A | | 5/1973 | Clarke et al. |
| 3,776,213 A | | 12/1973 | Clarke et al. |
| RE28,926 E | | 8/1976 | Baxter, Jr. |
| 4,123,199 A | * | 10/1978 | Shimizu et al. ........... 416/244 A |
| 4,475,869 A | | 10/1984 | Davies |
| 4,934,138 A | | 6/1990 | Boyd |
| 5,169,297 A | | 12/1992 | Mizuno et al. |
| 5,267,397 A | | 12/1993 | Wilcox |
| 5,536,144 A | * | 7/1996 | Bednarz et al. ........... 416/198 A |

(Continued)

FOREIGN PATENT DOCUMENTS

WO 9006421 A1 6/1990

*Primary Examiner* — Edward Look
*Assistant Examiner* — Su Htay
(74) *Attorney, Agent, or Firm* — Kinney & Lange, P.A.

(57) ABSTRACT

A rotor assembly for a miniature gas turbine propulsion system comprises a centrifugal compressor wheel, a turbine wheel, a shaft and a tie bolt. The centrifugal compressor wheel includes a first curved tooth coupling, and the turbine wheel includes a second curved tooth coupling interconnected with the first curved tooth coupling. The shaft extends from the centrifugal compressor wheel, and the tie bolt extends between the shaft and the turbine wheel to bring the first curved tooth coupling into compression with the second curved tooth coupling. As such, the compressor wheel and the turbine wheel are assembled and remain, over the operational envelope of the propulsion system, in a reliably robust aligned configuration.

16 Claims, 4 Drawing Sheets

U.S. PATENT DOCUMENTS

| | | |
|---|---|---|
| 5,537,814 A | 7/1996 | Nastuk et al. |
| 5,618,162 A | 4/1997 | Chan et al. |
| 5,628,621 A | 5/1997 | Toborg |
| 6,276,124 B1 * | 8/2001 | Soh et al. .................. 60/805 |
| 6,375,421 B1 | 4/2002 | Lammas et al. |
| 6,392,313 B1 * | 5/2002 | Epstein et al. ............. 290/52 |
| 6,439,849 B1 | 8/2002 | Sehgal et al. |
| 6,572,337 B1 * | 6/2003 | Herron .................. 416/198 A |
| 6,595,751 B1 | 7/2003 | Straub et al. |
| 6,672,966 B2 | 1/2004 | Sandoval et al. |
| 6,866,478 B2 | 3/2005 | Fabian et al. |
| 6,935,840 B2 | 8/2005 | Romani et al. |
| 7,004,725 B2 * | 2/2006 | Vache et al. ............. 416/93 R |
| 7,112,036 B2 | 9/2006 | Lubell et al. |
| 7,182,579 B2 | 2/2007 | Roso et al. |
| 7,452,188 B2 * | 11/2008 | Bouchard ................. 416/204 R |
| 7,811,052 B2 * | 10/2010 | Guihard et al. ............ 415/122.1 |
| 2002/0079760 A1 | 6/2002 | Vessa |
| 2003/0217548 A1 * | 11/2003 | Sekihara et al. ............. 60/272 |
| 2006/0130456 A1 | 6/2006 | Suciu et al. |
| 2007/0237646 A1 * | 10/2007 | Shi et al. .................. 416/244 A |
| 2009/0031732 A1 * | 2/2009 | Wilson et al. ............... 60/792 |

* cited by examiner

CURVED TOOTH COUPLING FOR A MINIATURE GAS TURBINE ENGINE

STATEMENT OF GOVERNMENT INTEREST

The U.S. Government has a paid-up license in this invention and the right in limited circumstances to require the patent owner to license others on reasonable terms as provided for by the terms of Contract No. F08635-03-C-0002 awarded by The United States Air Force.

BACKGROUND

The present invention relates to miniature gas turbine engines and in particular to shaft couplings for rotor assemblies comprising turbine wheels and compressors. Miniature gas turbine engines operate in much the same ways a conventional gas turbine engines in that fuel is combusted in a source of compressed air to generate high energy gases for producing thrust and rotating turbines. As with conventional gas turbine engines, the turbines are used to turn a compressor to compress air for the combustion process, turn fan blades or eject gases at high velocity to produce thrust, or turn a generator for operating electrical systems. However, miniature gas turbine engines are much smaller such that they are readily applicable as propulsion systems for small vehicles. For example, miniature gas turbine engines producing approximately 30 lbf (~133.5 N) of thrust or more are often used as propulsion systems for aircraft, such as reconnaissance drones, or projectile weapons, such as cruise missiles, and air-launched and ground-launched weapon systems. Miniature gas turbine engines extend the range of these aircraft and weapons beyond what is traditionally available from conventional rocket engines. Due to the usually exigent and expendable circumstances in which these aircraft and weapons systems are used, it is desirable to have miniature gas turbine propulsion systems that are at the same time reliable and cost effective.

The rotor assembly, i.e. the shaft coupling between the turbine and the compressor, in the miniature gas turbine engine affects both reliability and manufacturing cost. The compressor and turbine together comprise the main rotating unit within the miniature gas turbine engine that rotates at very high speeds while being subject to wide ranging temperatures. Due to thermal expansion and the high rotational speed, any misalignment or uncoupling of these components has the potential to produce instability during operation of the engine. The compressor typically comprises a wheel having a bore that is fitted onto a shaft integrated with the turbine. The compressor and shaft are conventionally coupled together through a simple radial interference fit. The interference fit requires that shafts and compressor bores be precision machined such that the components can be matched to form an interference fit having the desired torque transmitting capabilities. Thus, radial interference fits for shaft couplings are not conducive to easy, cost-effective manufacturing on a large scale, which makes miniature gas turbines less attractive for expendable applications. Furthermore, during operation of the miniature gas turbine, thermal growth and centrifugal expansion of the compressor wheel has the potential to cause separation from the turbine shaft, thus causing balance instabilities and making the shaft coupling less reliable than desired. In worse case scenarios, the compressor wheel may burst at the interference fit due to heating of the shaft and turbine during operation of the engine. There is, therefore, a need for a more reliable and inexpensive coupling mechanism for use in miniature gas turbine engines.

SUMMARY

The present invention is directed toward a rotor assembly for a miniature gas turbine propulsion system. The rotor assembly comprises a centrifugal compressor wheel, a turbine wheel, a shaft and a tie bolt. The centrifugal compressor wheel includes a first curved tooth coupling, and the turbine wheel includes a second curved tooth coupling interconnected with the first curved tooth coupling. The shaft extends from the centrifugal compressor wheel, and the tie bolt extends between the shaft and the turbine wheel to bring the first curved tooth coupling into compression with the second curved tooth coupling. As such, the compressor wheel and the turbine wheel are assembled in a robust aligned configuration.

DETAILED DESCRIPTION

Figure 1:
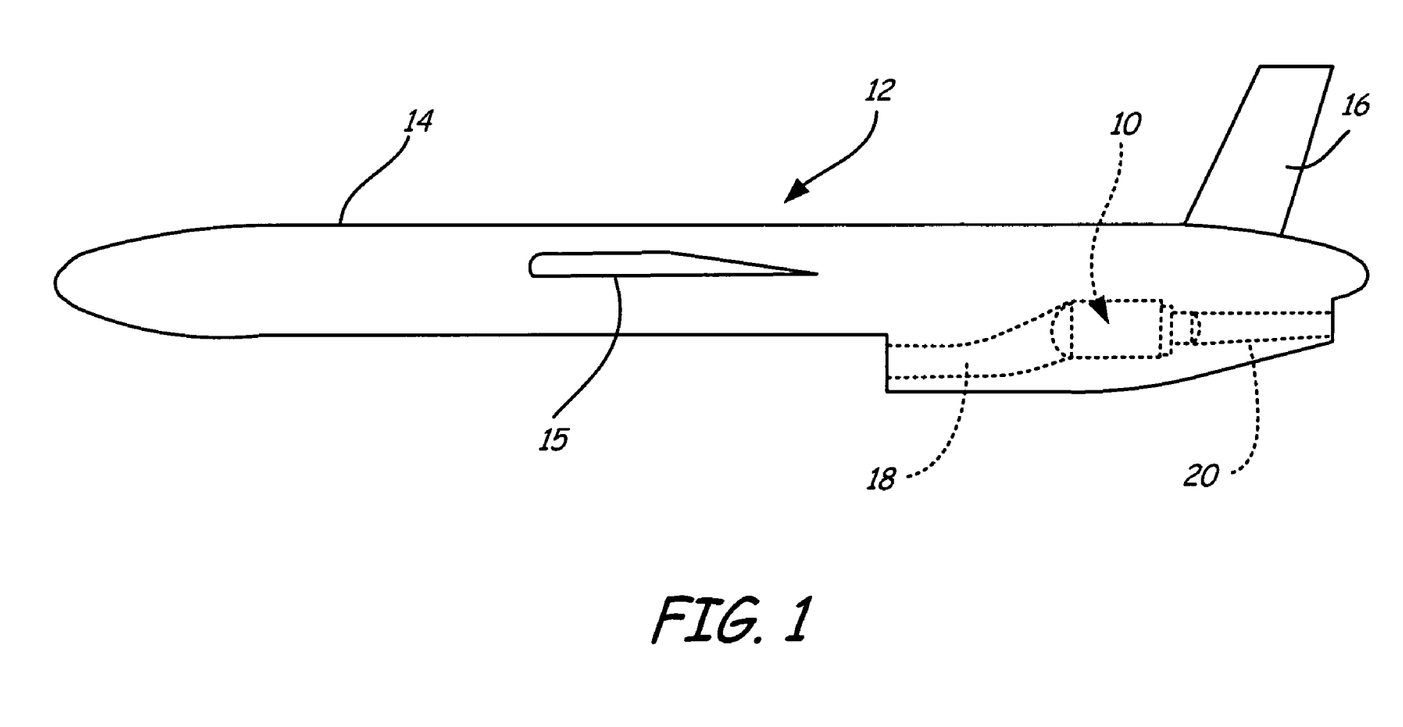
FIG. 1 shows a vehicle including a miniature gas turbine engine for use with the curved tooth coupling of the present invention.

FIG. 1 shows miniature gas turbine engine 10 of the present invention disposed within vehicle 12. Vehicle 12 includes main body 14, which includes aerodynamic surfaces 15 and 16. Main body 14 also includes intake duct 18 and exhaust duct 20, between which is disposed miniature gas turbine engine 10. Intake duct 18 is open to the outside of main body 14 such that ambient air is permitted to enter engine 10. Engine 10 compresses and mixes the ambient air with a fuel carried onboard vehicle 12 to carry out a combustion process for producing thrust. Exhaust gas produced by the combustion process is expelled from engine 10 to produce thrust and passed from vehicle 12 through exhaust duct 20. In other embodiments, engine 10 is coupled to the exterior of main body 14 by any conventional means.

Gas turbine engine 10 is configured for use in small-scale systems such as vehicle 12 and, in one embodiment, is approximately twelve to approximately thirteen inches (~30.5-~33.0 cm) in length. Vehicle 12 is representative of various reusable and single-use applications in which miniature gas turbine engine 10 may be used. For example, in one embodiment of the invention, vehicle 12 comprises a reconnaissance drone aircraft, with aerodynamic surface 15 comprising a wing and aerodynamic surface 16 comprising a vertical stabilizer. In another embodiment, vehicle 12 comprises an air-launched or ground-launched cruise missile, with aerodynamic surfaces 15 and 16 comprising stabilizers. Vehicle 12 may also be used in other civilian or military applications such as weapon systems or weapon decoys. Thus, vehicle 12 is often called upon to perform critical missions and flight objectives that require reliable performance of engine 10. Furthermore, it is preferable that engine 10 be inexpensive to reduce costs associated with missions in which vehicle 12 is expendable. Engine 10 includes a main rotor shaft toothed coupling, which increases the reliability of engine 10 such that vehicle 12 is well-suited for use in exigent circumstances where reliability is critical. The toothed shaft coupling also enhances the manufacturability of engine 10 such that costs associated with expendable embodiments of vehicle 12 are reduced.

Figure 2:
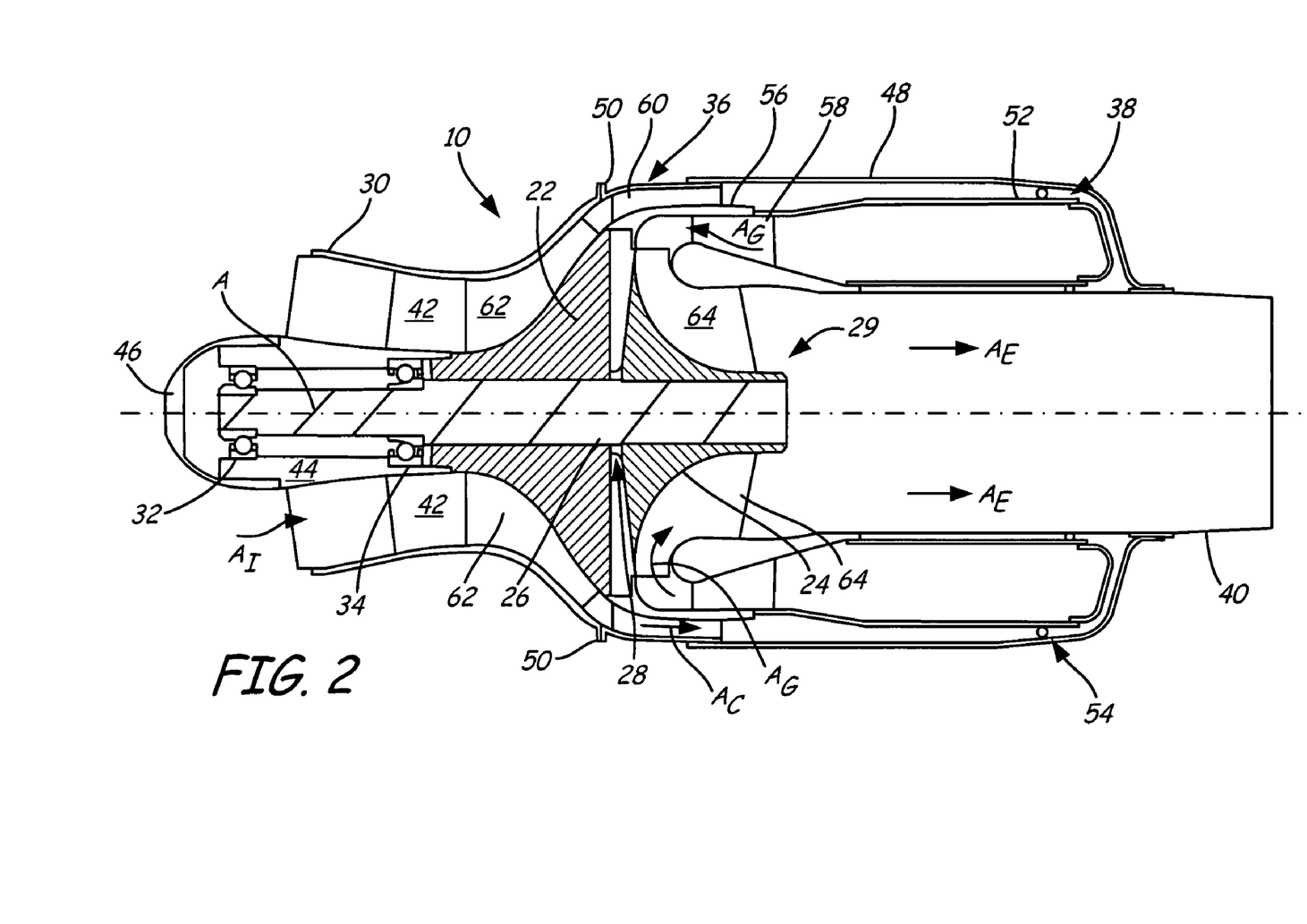
FIG. 2 shows a cross sectional, schematic view of a miniature gas turbine engine including a compressor wheel and a turbine wheel which are mounted to a turbine shaft.

FIG. 2 shows a cross sectional, schematic view of miniature gas turbine engine 10, in which the operational principles of miniature gas turbine engines are well illustrated. Engine 10 utilizes rotation of rotor assembly 29, which comprises three main components: compressor wheel 22, turbine wheel 24 and turbine shaft 26, to generate thrust. Engine 10 also includes inlet housing 30, forward bearing 32, aft bearing 34, diffuser assembly 36, combustion system 38, exhaust nozzle 40, struts 42 and shaft support 44. Toothed coupling 28 can also be placed between compressor wheel 22 and turbine wheel 24. A typical miniature gas turbine engine utilizes a radial interference fit to retain compressor wheel 22 and turbine wheel 24 joined with turbine shaft 26 such that shaft 26 rotates smoothly within bearings 32 and 34 while turbine wheel 24 rotates within diffuser assembly 36. As discussed in greater detail below, the present invention incorporates a tie bolt (not shown) to maintain axial engagement of compressor wheel 22 and turbine wheel 24, and toothed coupling 28 between compressor wheel 22 and turbine wheel 24 to maintain radial torque transmission between compressor wheel 22 and turbine wheel 24, while accommodating rotational and thermal variations that arise during operation of engine 10.

Shaft 26 includes a cold section, where compression of inlet air occurs within engine 10, and a hot section, where combustion of fuel occurs within engine 10. Inlet housing 30 surrounds the cold portion of shaft 26, where compressor wheel 22 is mounted, while diffuser assembly 36 surrounds the hot portion of shaft 26, where turbine wheel 24 is mounted. Shaft support 44 comprises an annular structure into which shaft 26 is inserted. Shaft support 44 is maintained stationary through connection with struts 42, which are anchored by housing 30. A plurality of struts 42 extend radially between shaft support 44 and housing 30. Forward bearing 32 and aft bearing 34 are disposed within shaft support 44 to support shaft 26 at axially displaced locations. End cap 46 is placed around shaft support 44 to seal bearings 32 and 34 within shaft support 44. As such, shaft 26 is configured to rotate about axis A within support 44 and inlet housing 30. Diffuser assembly 36 is connected with inlet housing 30 using, for example, threaded fasteners at flanged coupling 50, and combustor housing 48 extends axially downstream from diffuser assembly 36 to surround combustion system 38. Combustion system 38 includes combustor 52 and fuel manifold 54; and diffuser assembly 36 includes divider 56, inner flow diverter 58 and outer flow diverter 60. Combustor 52 comprises an annular hollow body in which the combustion process of engine 10 is carried out. Combustor housing 48 is maintained stationary within engine 10 through connection with diffuser assembly 36 and exhaust nozzle 40. Combustor 52 rests on exhaust nozzle 40 and is connected with flow diverter 56 at its forward end.

Inlet air $A_I$ enters engine 10, such as from intake duct 18 (FIG. 1), at inlet housing 30. End cap 46 diverts inlet air $A_I$ around shaft support 44 and shaft 26. Struts 42 also function as inlet guide vanes to direct inlet air $A_I$ into compressor wheel 22. Compressor wheel 22 includes a plurality of compressor blades 62, which are disposed on a radially outward exposed face of compressor wheel 22 to face housing 30 and diffuser assembly 36. Compressor blades 62 comprise aerodynamically contoured blades that face the upstream direction such that they take in inlet air $A_I$. The outward exposed face of compressor wheel 22 slopes outward toward housing 30 so as to comprise a centrifugal or radial flow compressor. The cross sectional area of compressor blades 62 decreases between intake housing 30 and compressor wheel 22 such that intake air $A_I$ is compressed as it leaves housing 30 and enters diffuser assembly 36.

Diffuser assembly 36 comprises an annular body for connecting the cold section of engine 10 with the hot section of engine 10. Diffuser assembly guides gases into and out of combustor 52. Compressed air $A_C$ enters diffuser assembly 36 at outer diverter 60, which extends from the outer surface of divider 56, to straighten compressed air $A_C$ entering combustor 52. Combustion gases $A_G$ leave combustor 52 and enter diffuser assembly 36 at inner diverter 58, which extends from the inner surface of divider 56, to straighten combustion gases $A_G$ entering turbine wheel 24. Combustor 52 comprises a U-shaped annular body that transforms the downstream flow of compressed air $A_C$ to an upstream flow of combustion gases $A_G$ through the combustion process. The radially outer wall portion of combustor 52 includes an array of small holes or apertures (not shown) that permit compressed air $A_C$ to enter the interior of combustor 52. Fuel manifold 54 injects a supply of fuel into the interior of combustor 52. The fuel is ignited with an ignition system (not shown), which may comprise any suitable ignition system as is know in the art, to initiate and sustain a combustion process with compressed air $A_C$. The combustion process yields high energy combustion gases $A_G$, which are directed to turbine wheel 24 by divider 56.

Combustion gases $A_G$ impinge upon turbine blades 64 of turbine wheel 24, whereupon turbine blades 64 extract some of the energy from combustion gases $A_G$ to turn turbine wheel 24 and compressor wheel 22 to produce compressed air and sustain the combustion process. Turbine wheel 24 comprises a radially outward exposed face from which turbine blades 64 extend. Turbine blades 64 comprise aerodynamically contoured blades that face the downstream direction such that they expel exhaust gases $A_E$ in the downstream direction. The outward exposed face of turbine wheel 24 slopes inward toward exhaust nozzle 40 in the direction of flow so as to comprise a vortical or radial flow turbine. The cross sectional area of turbine blades 64 increase such that exhaust gas $A_E$ is permitted to expand as it leaves turbine blades 64 and enters exhaust nozzle 40. Compressor wheel 22 through shaft 26 and turbine wheel 24 rotates to continuously compress inlet air $A_I$ within compressor blades 62 to sustain the combustion process. Exhaust gas $A_E$ also produces thrust to drive engine 10 in the forward direction as it leaves exhaust nozzle 40.

During operation of engine 10, rotor assembly 29 (shaft 26, compressor wheel 22 and turbine wheel 24) constitutes the power generating system of engine 10. In one embodiment, shaft 26, compressor wheel 22 and turbine wheel 24 rotate within engine 10 at speeds from approximately 90,000 to approximately 150,000 RPM (revolutions per minute). Additionally, shaft 26 spans the cold and hot section of engine 10 such that it is exposed to a wide range of temperatures. For example, in one embodiment, the cold section reaches temperatures of approximately 900° F. (~482.2° C.), while the hot section reaches temperatures of approximately 1800° F. (~982.2° C). Furthermore, shaft 26, compressor wheel 22 and turbine wheel 24 are directly subject to the forces of the thrust produced by engine 10. In various embodiments, engine 10 produces approximately 30 lbf (~133.5 N) of thrust or more. As such, shaft 26, compressor wheel 22 and turbine wheel 24 are subject to the most rigorous operating environment within engine 10, while also being the most critical to proper operation of engine 10. In particular, any unbalance in rotor assembly 29 due to, for example thermal growth or centrifugal expansion, may cause engine 10 to lose efficiency by, for example, losing compression or thrust production. Any such reduction in performance parameters may lead to failure of engine 10 to meet mission requirements. For example, loss of fuel efficiency may prevent a reconnaissance vehicle from reaching a specified objective, while loss of thrust output may cause a missile to miss an intended target. Furthermore, severe unbalance may even cause failure of engine 10.

The present invention incorporates toothed coupling 28 into engine 10 between compressor wheel 22 and turbine wheel 24 to provide improved rotation and assembly of compressor wheel 22, turbine wheel 24 and shaft 26 as compared to typical radial interference fit coupling configurations. Additionally, the present invention incorporates a tensioning tie bolt (not shown) into shaft 26 to keep turbine wheel 24 in contact with compressor wheel 22. The tensioning tie bolt and toothed coupling 28 precisely engage the compressor wheel 22 and turbine wheel 24 radially, while maintaining axial retention between the two members due to engagement of the curved sidewalls of the teeth. In other embodiments of the invention, other intermeshing toothed couplings may be used. For example, splines, face splines, face gears, face couplings or snap couplings, as are known in the art, may be used. In any embodiment, such toothed couplings transmit rotational torque between turbine wheel 24 and compressor wheel 22 and prevent relative motion between turbine wheel 24 and compressor wheel 22.

Figure 3:
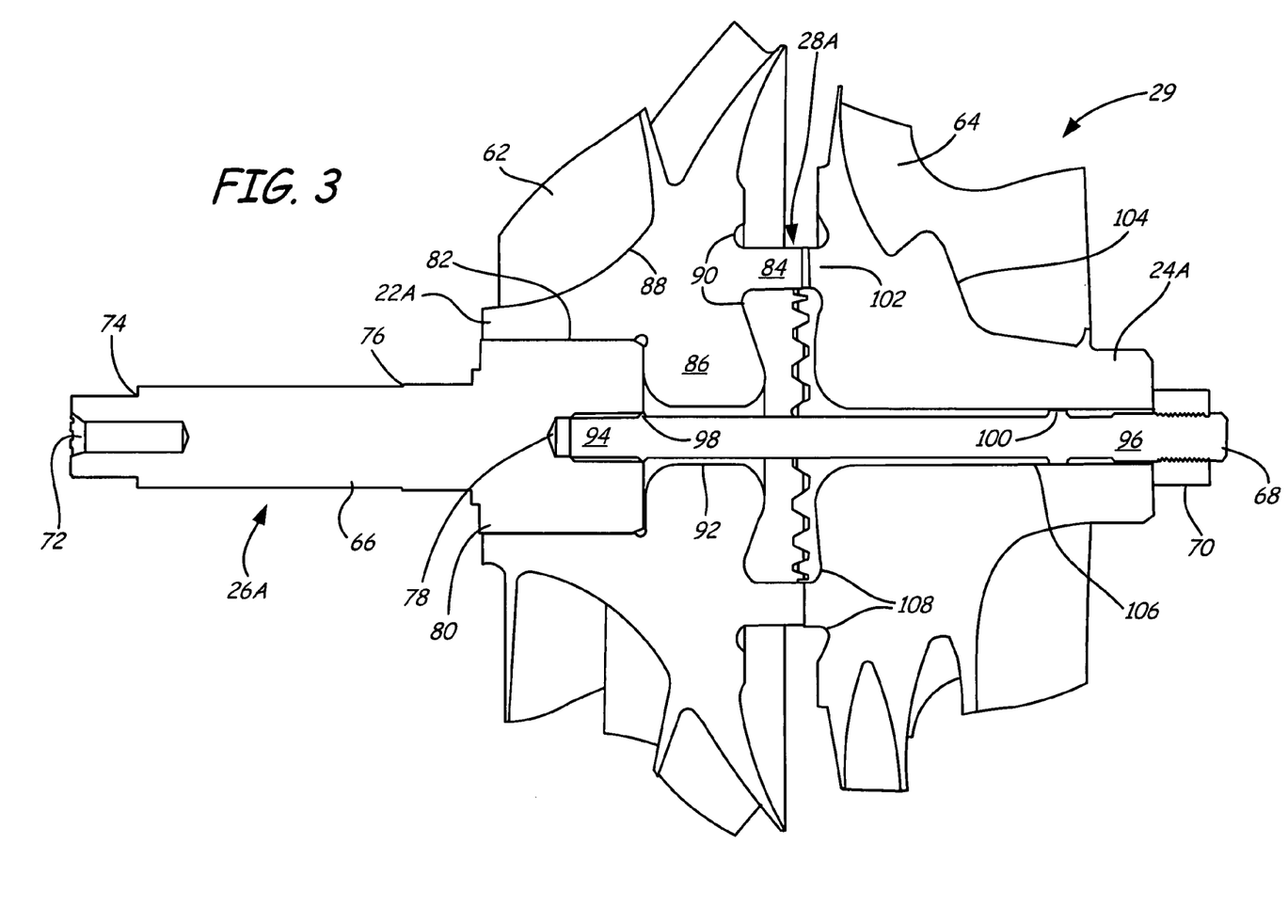
FIG. 3 shows a cross sectional view of a first embodiment of a curved toothed coupling of the present invention in which a turbine wheel and a compressor wheel are attached to a turbine shaft with an aftward extending torqued compressive tie bolt.
Figure 4:
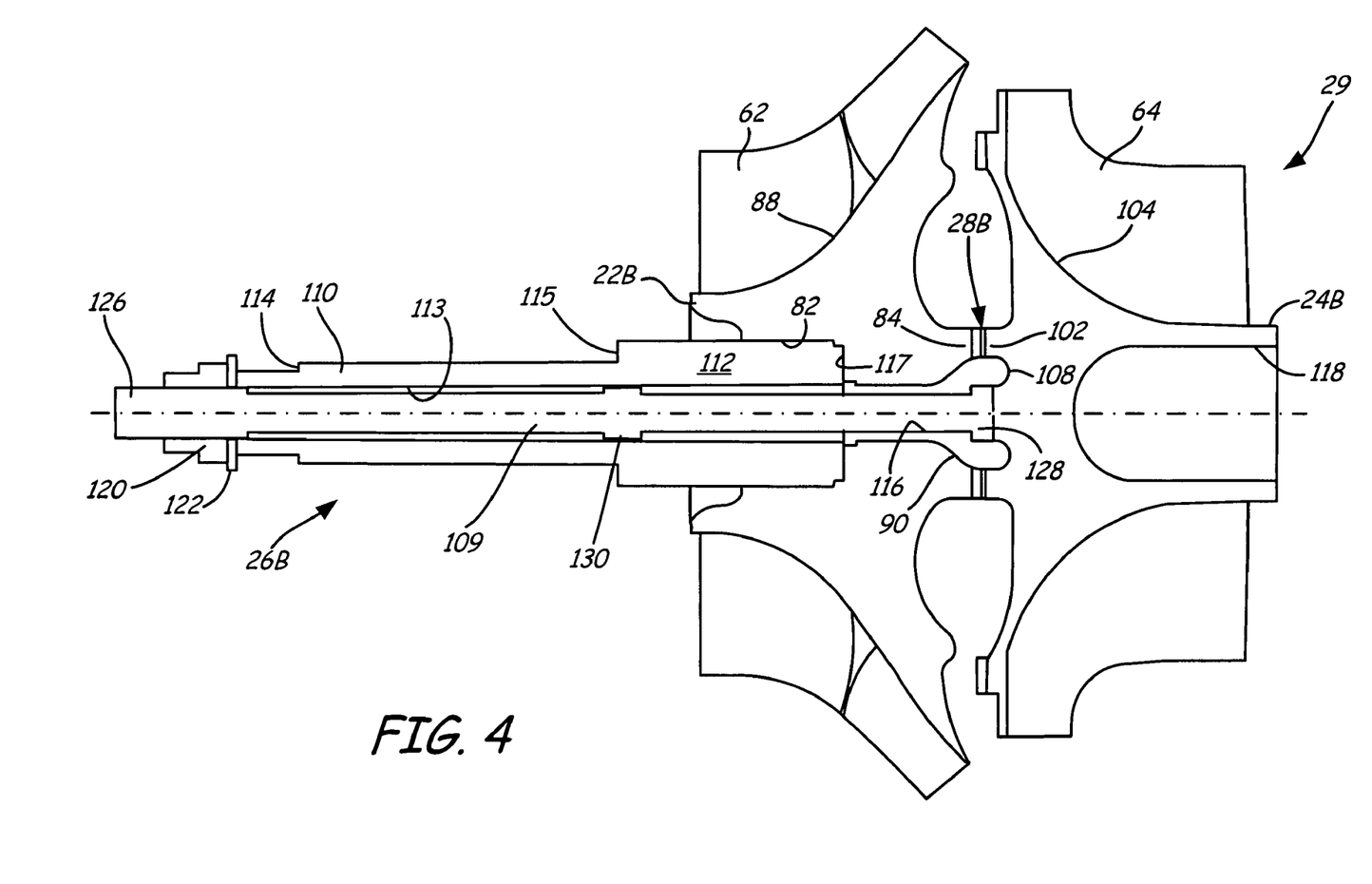
FIG. 4 shows a cross sectional view of a second embodiment of a curved toothed coupling of the present invention in which a turbine wheel and a compressor wheel are attached to a turbine shaft with a forward extending torqued compressive tie bolt.

In other embodiments, as are discussed in greater detail with respect to FIGS. 3 and 4, toothed coupling 28 comprises a curved tooth coupling, which, as used in this application, generally refers to any toothed coupling wherein mating teeth include complimentary curved sidewalls. For example, a curved tooth coupling typically comprises one set of "barrel" shaped teeth having longitudinally convex sidewalls, and another set of "hourglass" shaped teeth having complimentary longitudinally concave sidewalls. Examples of such longitudinally curved tooth couplings are so-called Curvic® couplings, a registered trademark of The Gleason Works, Rochester, N.Y. Such Curvic® couplings and processes for making the same are described in greater detail in U.S. Pat. No. 2,384,582 by Wildhaber and U.S. Pat. No. 3,640,030 by Clarke et al., which are assigned to The Gleason Works, Rochester, N.Y., and are hereby incorporated by this reference. With such oppositely curved and intermeshed sidewalls, both radial and axial displacement between members of the curved tooth coupling, compressor wheel 22 and turbine wheel 24, is prevented.

FIG. 3 shows a cross sectional view of curved tooth coupling 28A as can be used in rotor assembly 29 of engine 10 in FIG. 2. Rotor assembly 29 includes compressor wheel 22A, turbine wheel 24A, shaft 26A and curved tooth coupling 28A. Shaft 26A includes support shaft 66, tie bolt 68 and tensioning nut 70. Support shaft 66 includes forward bore 72, forward shoulder 74, aft shoulder 76, aft bore 78 and hub 80. Compressor wheel 22A comprises an annular body including compressor blades 62, counterbore 82, first coupling flange 84, lobe 86, reaction surface 88, profiled radii 90 and central bore 92. Tie bolt 68 includes first end 94, second end 96, shoulder 98 and ring 100. Turbine wheel 24A comprises an annular body and includes turbine blades 64, second coupling flange 102, reaction surface 104, central bore 106 and profiled radii 108.

In the embodiment of FIG. 3, shaft 26A includes tie bolt 68 that extends through compressor wheel 22A and turbine wheel 24A to retain compressor wheel 22A between turbine wheel 24A and shaft 26A. Specifically, compressor wheel 22A is mounted to the aft end of support shaft 66. Tie bolt 68 extends from the aft end of support shaft 66 and through central bore 92 of compressor wheel 22A and through central bore 106 of turbine wheel 24A. Turbine wheel 24A surrounds tie bolt 68 and mates with compressor wheel 22A utilizing curved tooth coupling 28A. Tensioning nut 70 affixes to the aft end of tie bolt 68 to engage turbine wheel 24A into contact with compressor wheel 22A through curved tooth coupling 28A by putting tie bolt 68 in tension. As such, turbine wheel 24A, compressor wheel 22A and shaft 26A rotate in unison during operation of engine 10. During operation of engine 10, compressor blades 62 receive inlet air from engine 10, for example, from intake duct 18 (FIG. 1). Reaction surface 88 of compressor wheel 22A is inclined radially outwardly as it extends from the forward end to the aft end of compressor wheel 22A and, in conjunction with compressor blades 62, compresses air within engine 10. Reaction surface 104 of turbine wheel 24A receives combustion gases, which are produced utilizing the compressed air, from engine 10 and declines radially inward as it extends from the forward end to the aft end of turbine wheel 24A and, in conjunction with turbine blades 64, pushes air out from within engine 10 and rotate shaft 26A.

Support shaft 66 comprises a cylindrical body that rides within forward bearing 32 and aft bearing 34 (FIG. 2) to support rotor assembly 29 within engine 10. Forward bore 72 receives a threaded fastener to retain an end cap or some other component of engine 10. Forward shoulder 74 and aft shoulder 76 retain and bias rotor assembly 29 against forward bearing 32 and aft bearing 34, respectively. Aft bore 78 is disposed at the aft end of support shaft 66 and includes threads for receiving tie bolt 68. In other embodiments, however, tie bolt 68 may be connected to support shaft 66 by other means such as welding. Hub 80 comprises a cylindrical body disposed at the aft end of support shaft 66 to mate with compressor wheel 22A.

Counterbore 82 and central bore 92 of compressor wheel 22A extend through the central axis of compressor wheel 22A, and reaction surface 88 is disposed at the radial outer diameter of compressor wheel 22A. Counterbore 82 is fit over hub 80 such that the aft end of hub 80 abuts lobe 86 of compressor wheel 22A. In one embodiment, counterbore 82 and hub 80 form an interference fit. In other embodiments, however, hub 80 is welded to or threaded into counterbore 82. Central bore 92 is formed by lobe 86, which comprises an annular counterweight to reaction surface 88 and blades 62. Coupling flange 84 is disposed on the aft side of compressor wheel 22A to engage turbine wheel 24A. Coupling flange 84 comprises an aftward projection upon which teeth of curved tooth coupling 28A are positioned to mesh with teeth on turbine wheel 24A. Profiled radii 90 provide stress relief to flange 84 such as to prevent cracks from loading by turbine wheel 24A. Tie bolt 68 extends from aft bore 78 in support shaft 66 and through central bore 92 to connect turbine wheel 24A with compressor wheel 22A through curved tooth coupling 28A.

In the embodiment shown, first end 94 of tie bolt 68 includes threads and is threaded into mating threads within aft bore 78 to provide a rigid, fixed connection with support shaft 66. Shoulder 98 ensures first end 94 is properly seated within aft bore 78 such as, for example, preventing tie bolt 68 from extending too far into aft bore 78. Second end 96 extends through central bore 106 of turbine wheel 24A to receive tensioning nut 70. Central bore 106 extends from the forward end of turbine wheel 24A through to the aft end of turbine wheel 24A. Tie bolt 68 has an outer diameter smaller than the diameter of central bore 106 such that tie bolt 68 and turbine wheel 24A are easily assembled. Also, the diameters of tie bolt 68 and central bore 106 are selected to permit thermal growth of tie bolt 68 and turbine wheel 24A. Tie bolt 68, however, also includes ring 100, which assists in centering tie bolt 68 within central bore 106 and aligning tie bolt 68 with aft bore 78. Coupling flange 102 is disposed on the forward side of turbine wheel 24A to engage coupling flange 84 of compressor wheel 22A. Coupling flange 102 comprises a forward projection upon which teeth of curved tooth coupling 28A are positioned to mesh with teeth on coupling flange 84. Profiled radii 108 provide stress relief to flange 102 such as to prevent cracks from loading by compressor wheel 22A. Tensioning nut 70 is fitted onto second end 96 of tie bolt 68 to join coupling flange 84 with coupling flange 102. In the embodiment shown, second end 96 includes threads for receiving mating threads on tensioning nut 70. Tensioning nut 70 is tightened onto tie bolt 68 to compress coupling flange 84 with coupling flange 102. In another embodiment, tensioning nut 70 is rigidly fixed to tie bolt 68 such as by welding. In another embodiment, tie bolt 68 includes a bolt head at second end 96 that can be rotated to engage first end 94 with aft bore 78. In any embodiment, however, tie bolt 68 is put in tension to retain axial engagement of coupling flange 84 and coupling flange 102 over the build and operating envelope of engine 10.

In the embodiment shown, first coupling flange 84 and second coupling flange 102 include intermeshing teeth that engage to form a curvic coupling. In the present invention, one set of teeth is disposed circumferentially about the aft facing end of coupling flange 84, with the other set of teeth disposed circumferentially about the forward facing end of coupling flange 102. In alternative embodiments, the convexly curved teeth are disposed on coupling flange 84 and the concavely shaped teeth are disposed on coupling flange 102, or the convexly shaped teeth are disposed on coupling flange 102 and the concavely shaped teeth are disposed on coupling flange 84. Tie bolt 68 extends between turbine wheel 24A and compressor wheel 22A to maintain meshing of curved tooth coupling 28A, thus permitting rotational torque to be transmitted from turbine 24A to compressor 22A. In the embodiment of FIG. 3, tie bolt 68 extends through turbine wheel 24A and tensioning nut 70 compresses coupling flange 102 onto coupling flange 84 to transmit axial and torsion loads from turbine wheel 24A to compressor wheel 22A and shaft 26A. However, in other embodiments, compressor wheel 22A, turbine wheel 24A and shaft 26A can be joined in other configuration to maintain the aligned, no-motion required assembly of curved tooth coupling 28A.

FIG. 4 shows a cross sectional view of curved tooth coupling 28B as can be used in rotor assembly 29 of engine 10 in FIG. 2. Rotor assembly 29 includes compressor wheel 22B, turbine wheel 24B, shaft 26B and curved tooth coupling 28B. In the embodiment of FIG. 4, turbine wheel 24B includes tie bolt 109 that extends through shaft 26B to retain compressor wheel 22B between turbine wheel 24B and shaft 26B. Shaft 26B includes support shaft 110, hub 112, central bore 113, first shoulder 114 and second shoulder 115. Compressor wheel 22B includes compressor blades 62, counterbore 82, coupling flange 84, reaction surface 88 and profiled radii 90, which are similar in construction as the like-numbered components of the embodiment of FIG. 3. Compressor wheel 22B also includes central bore 116, which extends through the central axis of compressor wheel 22B and counterbore 82, and shoulder 117, which comprises a base of counterbore 82 at the forward end of central bore 116. Turbine wheel 24B includes turbine blades 64, coupling flange 102, reaction surface 104 and profiled radii 108, which are similar in construction as the like-numbered components in the embodiment of FIG. 3. Turbine wheel 24B also includes aft bore 118, tensioning nut 120, washer 122 and tie bolt 109, which includes forward end 126, rear end 128 and ring 130.

In the embodiment of FIG. 4, shaft 26B includes tie bolt 109 that extends through compressor wheel 22B to retain compressor wheel 22B between turbine wheel 24B and shaft 26B. Specifically, compressor wheel 22B is mounted to the aft end of support shaft 110 on hub 112. Turbine wheel 24B is connected to the aft of tie bolt 109 and mates with compressor wheel 22B at coupling flanges 84 and 102. Tie bolt 109 extends from the forward end of turbine wheel 24B, through central bore 116 of compressor wheel 22B and central bore 113 of support shaft 110, to tensioning nut 120 at the forward end of support shaft 110. Tensioning nut 120 affixes to the forward end of tie bolt 109 to engage turbine wheel 24B with compressor wheel 22B through curved tooth coupling 28B.

Support shaft 110 comprises a cylindrical body that rides within forward bearing 32 and aft bearing 34 (FIG. 2) to support rotor assembly 29 within engine 10. First shoulder 114 and second shoulder 115 retain and bias rotor assembly 29 against forward bearing 32 and aft bearing 34, respectively. Hub 112 comprises a cylindrical body disposed at the aft end of support shaft 110 to mate with compressor wheel 22B. Compressor wheel 22B comprises a centrifical compressor and turbine wheel 24B comprises a centrifugal turbine, such as is described with respect to FIGS. 2 & 3, to compress and react with airflows within engine 10. Aft bore 118 of turbine wheel 24B is provided for weight reduction or balancing of engine 10. Counterbore 82 is fit over hub 112 such that the aft end of hub 112 abuts shoulder 117 of compressor wheel 22B. In one embodiment, counterbore 82 and hub 112 form an interference fit. In other embodiments, however, hub 112 is welded to or threaded into counterbore 82. Central bore 116 extends from the aft end of counterbore 82 through to the aft end of compressor wheel 22B.

Tie bolt 109 extends from tensioning nut 120 through central bore 113 and central bore 116 to the forward face of turbine wheel 24B. In the embodiment shown, second end 128 of tie bolt 109 is welded to the forward face of turbine wheel 24B to provide a permanent connection with turbine wheel 24B. As such, threaded couplings are removed from the hot section of engine 10. In other embodiments, however, rear end 128 could be threaded into a mating bore within the forward face of turbine wheel 24B. Tie bolt 109 has an outer diameter smaller than the diameter of central bore 113 such that tie bolt 109 and turbine wheel 24B are easily assembled. Also, the diameters of tie bolt 109 and central bore 113 are selected to permit thermal growth of tie bolt 109 and turbine wheel 24B. Tie bolt 109, however, also includes ring 130, which assists in centering tie bolt 109 within central bore 113. Forward end 126 includes threads and is threaded into mating threads within tensioning nut 120 such that turbine wheel 24B loads compressor wheel 22B against hub 112 of support shaft 110. Tensioning nut 120 is tightened onto tie bolt 109 to engage coupling flange 84 with coupling flange 102 through tensioning tie bolt 109.

As is described with respect to FIG. 3, coupling flange 84 is disposed on the aft side of compressor wheel 22B to engage coupling flange 102, which is disposed on the forward side of turbine wheel 24B. Coupling flange 84 comprises an aftward projection upon which teeth of curved tooth coupling 28B are positioned to mesh with teeth on turbine wheel 24B. Profiled radii 90 provide stress relief to flange 84. Coupling flange 102 comprises a forward projection upon which teeth of curved tooth coupling 28B are positioned to mesh with teeth on coupling flange 84. Profiled radii 108 provide stress relief to flange 102. As with tie bolt 68 and tensioning nut 70 of FIG. 3, tie bolt 109 and tensioning nut 120 of FIG. 4 hold and retain coupling flange 102 in contact with coupling flange 84 to maintain the aligned, no-motion required assembly of curved tooth coupling 28B.

Toothed coupling 28 of present invention provides a compressor wheel and turbine wheel shaft coupling that is total cost effective, enhancing component manufacture and engine assembly of miniature gas turbine engines. The convex and concave teeth of curved tooth couplings 28A and 28B are machined into their respective flanges in one embodiment of the invention using conventional machining processes, such as grinding. Such process can be feasibly carried out in rotor assemblies fabricated from typical materials used in miniature gas turbine engines, such as metals and alloys. Predictable manufacturing from part to part and lot to lot is thus achieved. Manufacturing costs of the shaft coupling of the present invention are, therefore, also kept to minimum levels. Thus, total costs associated with miniature gas turbine engines used in expendable missions are reduced due to tooth coupling 28.

Additionally, toothed coupling 28 provides a more reliably accurate and robust compressor to turbine coupling system, thus improving reliability of miniature gas turbine engines. For example, curved tooth couplings 28A and 28B provide positive and precise engagement of compressor wheel 22A and turbine wheel 24A, and compressor wheel 22B and turbine wheel 24B, respectively, based on the interconnection of the geometries of the convex and concave teeth of curved tooth couplings. The specific geometries of the curved tooth coupling teeth are selected, based on design needs, to transmit torque and retain axial retention. Such geometries include the radius of curvature of the convex and concave teeth, tooth depth, fillet radii at the tooth root, number of teeth and the radial length of engagement along each tooth interface. The radial position of coupling flanges 84 and 102 can be selected to adjusted torsional effects on compressor wheels 22A and 22B and turbine wheels 24A and 24B. Due to the meshed axial engagement of curved tooth couplings 28A and 28B, turbine wheels 24A and 24B are readily able to transmit operational envelope torque requirements of engine 10 to shafts 26A and 26B, respectively, because of the enhanced robustness and accuracy of the curved tooth coupling system. Thus, reliability of miniature gas turbine engines used in mission-critical operations is increased.

Although the present invention has been described with reference to preferred embodiments, workers skilled in the art will recognize that changes may be made in form and detail without departing from the essence and scope of the invention.

The invention claimed is:

1. A rotor assembly for a miniature gas turbine propulsion system, the rotor assembly comprising:
   a centrifugal compressor wheel comprising a first curved tooth coupling disposed on an axially extending aft end flange of the compressor wheel;
   a turbine wheel comprising a second curved tooth coupling disposed on an axially extending forward end flange of the turbine wheel and interconnected with the first curved tooth coupling;
   a shaft extending from a forward end of the centrifugal compressor wheel; and
   a tie bolt extending between the shaft and the turbine wheel to bring the first curved tooth coupling into compression with the second curved tooth coupling;
   wherein the aft end flange and the forward end flange include stress relief profiled radii disposed at a base of each flange.

2. The rotor assembly of claim 1 wherein the centrifugal compressor wheel, the turbine wheel, the shaft and the tie bolt are assembled to span a distance less than about fourteen inches (~35.56 cm).

3. The rotor assembly of claim 1 wherein the first curved tooth coupling and the second curved tooth coupling are interconnected by a set of longitudinally concave teeth intermeshed with a set of longitudinally convex teeth.

4. The rotor assembly of claim 1 and further comprising:
   a first central bore within the compressor wheel;
   a second central bore within the shaft; and
   a threaded fastener positioned at a forward end of the shaft;
   wherein the tie bolt extends from a forward end of the turbine wheel and through the first and second central bores within the compressor wheel and the shaft, respectively, to the threaded fastener.

5. The rotor assembly of claim 4 wherein the tie bolt is welded to the forward end of the turbine wheel.

6. The rotor assembly of claim 1 and further comprising:
   a first central bore within the compressor wheel;
   a second central bore within the turbine wheel;
   a threaded fastener positioned at an aft end of the turbine wheel; and
   wherein the tie bolt extends from an aft end of the shaft and through the first and second central bores within the compressor wheel and the turbine wheel, respectively, to the threaded fastener.

7. The rotor assembly of claim 6 wherein the tie bolt is threaded into a bore in the aft end of the shaft.

8. A rotor assembly for a miniature gas turbine propulsion system, the rotor assembly comprising:
   a radial flow compressor wheel comprising:
      a first central bore; and
      a first coupling face including a first axially extending coupling face flange extending from an aft end of the compressor wheel;
   a radial flow turbine wheel comprising:
      a second coupling face including a second axially extending coupling face flange extending from a forward end of the turbine wheel, the second coupling face interconnected with the first coupling face by a set of concave-shaped teeth intermeshed with a set of convex-shaped teeth;
   a shaft extending from the first central bore of the radial flow compressor wheel;
   a tie bolt extending from the shaft to the turbine wheel through the first central bore; and
   a threaded fastener connected to the tie bolt to bring the first coupling face into contact with the second coupling face;
   wherein the first and second coupling face flanges include stress relief profiled radii disposed at a base of each flange.

9. The rotor assembly of claim 8 wherein the radial flow compressor wheel, the radial flow turbine wheel, the shaft and the tie bolt are assembled to span a distance less than about fourteen inches (~35.56 cm).

10. The rotor assembly of claim 8 wherein the tie bolt includes a ring for centering the tie bolt within the first central bore.

11. The rotor assembly of claim 8 and further comprising:
a second central bore within the shaft; and
wherein the tie bolt extends from a forward end of the turbine wheel and through the first and second central bores within the compressor wheel and the shaft, respectively to the threaded fastener positioned at a forward end of the shaft.

12. The rotor assembly of claim 8 and further comprising:
a second central bore within the turbine wheel; and
wherein the tie bolt extends from an aft end of the shaft and through the first and second central bores within the compressor wheel and the turbine wheel, respectively, to the threaded fastener positioned at an aft end of the turbine wheel.

13. A rotor assembly having an overall axial length of about fourteen inches (~35.56 cm) or less and disposed in a miniature gas turbine propulsion system, the rotor assembly comprising:
a compressor wheel comprising;
a first curved outer diameter having a plurality of integrated blades;
a first inner diameter bore extending through the compressor wheel;
a counterbore positioned forward of the first inner diameter bore to form a shoulder;
an axially extending aft end flange extending from the compressor wheel; and
a downstream mate face on the aft end flange and having first toothed coupling members;
a turbine wheel comprising:
a second curved outer diameter having a plurality of integrated blades;
a second inner diameter bore within the turbine wheel;
an axially extending forward end flange extending from the turbine wheel; and
an upstream mate face on the forward end flange and having second toothed coupling members configured for meshing with the first toothed coupling members; and
a shaft comprising:
a first shaft section extending in a forward direction from the counterbore of the compressor wheel such that an aft end of the first shaft section abuts the shoulder; and
a tie bolt extending from an aft end of the first shaft section, through the first inner diameter bore and the second inner diameter bore, and connected to the turbine wheel to retain the compressor wheel between the shoulder and the turbine wheel;
wherein the axially extending forward and aft flanges include stress relief profiled radii disposed at a base of each flange.

14. The rotor assembly of claim 13 wherein the first and second toothed coupling members include intermeshed convex and concave teeth that prevent relative rotation between the compressor wheel and the turbine wheel.

15. The rotor assembly having an overall axial length of about fourteen inches (~35.56 cm) or less and disposed in a miniature gas turbine propulsion system, the rotor assembly comprising:
a compressor wheel comprising;
a first curved outer diameter having a plurality of integrated blades;
a first inner diameter bore extending through the compressor wheel;
a counterbore positioned forward of the first inner diameter bore to form a shoulder;
an axially extending aft end flange extending from the compressor wheel; and
a downstream mate face on the aft end flange and having first toothed coupling members;
a turbine wheel comprising:
a second curved outer diameter having a plurality of integrated blades;
an axially extending forward end flange extending from the turbine wheel; and
an upstream mate face on the forward end flange and having second toothed coupling members configured for meshing with the first toothed coupling members; and
a shaft comprising:
a first shaft section extending in a forward direction from the counterbore of the compressor wheel such that an aft end of the first shaft section abuts the shoulder;
a second inner diameter bore within the shaft; and
a tie bolt extending from a forward end of the turbine wheel through the first inner diameter bore and the second inner diameter bore, and connected to the turbine wheel to retain the compressor wheel between the shoulder and the turbine wheel;
wherein the axially extending forward and aft flanges include stress relief profiled radii disposed at a base of each flange.

16. The rotor assembly of claim 15 wherein the first and second toothed coupling members include intermeshed convex and concave teeth that prevent relative rotation between the compressor wheel and the turbine wheel.

* * * * *

UNITED STATES PATENT AND TRADEMARK OFFICE
CERTIFICATE OF CORRECTION

| | | |
|---|---|---|
| PATENT NO. | : 8,215,919 B2 | Page 1 of 1 |
| APPLICATION NO. | : 12/070968 | |
| DATED | : July 10, 2012 | |
| INVENTOR(S) | : Gordon F. Jewess et al. | |

It is certified that error appears in the above-identified patent and that said Letters Patent is hereby corrected as shown below:

Col. 12, Line 8
  Delete "The"
  Insert --A--

Signed and Sealed this
Ninth Day of October, 2012

David J. Kappos
*Director of the United States Patent and Trademark Office*